United States Patent
Jalkanen et al.

(10) Patent No.: US 9,300,835 B2
(45) Date of Patent: Mar. 29, 2016

(54) IMAGE BASED INTERACTION

(75) Inventors: Janne Jalkanen, Espoo (FI); Ulla-Maaria Engestrom, Helsinki (FI)

(73) Assignee: Thinglink Oy, Helsinki (FI)

( * ) Notice: Subject to any disclaimer, the term of this patent is extended or adjusted under 35 U.S.C. 154(b) by 0 days.

(21) Appl. No.: 13/445,493

(22) Filed: Apr. 12, 2012

(65) Prior Publication Data

US 2013/0275517 A1    Oct. 17, 2013

(51) Int. Cl.
*G06F 15/16* (2006.01)
*H04N 1/21* (2006.01)
*H04N 1/00* (2006.01)

(52) U.S. Cl.
CPC ......... *H04N 1/2191* (2013.01); *H04N 1/00159* (2013.01); *H04N 2201/3246* (2013.01); *H04N 2201/3247* (2013.01); *H04N 2201/3266* (2013.01); *H04N 2201/3276* (2013.01)

(58) Field of Classification Search
CPC .............. H04L 29/06; H04L 29/08072; H04L 29/4076
USPC ......... 709/206, 205, 207, 220, 229, 204, 218, 709/235
See application file for complete search history.

(56) References Cited

U.S. PATENT DOCUMENTS

| | | | | |
|---|---|---|---|---|
| 8,255,495 B1* | 8/2012 | Lee | ........... | 709/219 |
| 8,392,538 B1* | 3/2013 | Lee | ........... | 709/219 |
| 9,015,245 B1* | 4/2015 | Lee | ........... | H04L 29/06476 709/203 |
| 9,189,559 B2* | 11/2015 | Luu | ........... | G06Q 30/0251 |
| 2012/0150944 A1* | 6/2012 | Steelberg et al. | ........... | 709/203 |
| 2012/0158850 A1* | 6/2012 | Harrison et al. | ........... | 709/205 |
| 2013/0047123 A1* | 2/2013 | May et al. | ........... | 715/834 |
| 2013/0073970 A1* | 3/2013 | Piantino et al. | ........... | 715/738 |
| 2013/0073971 A1* | 3/2013 | Huang et al. | ........... | 715/738 |
| 2015/0304368 A1* | 10/2015 | Vaccari | ........... | G06F 1/3215 709/206 |

OTHER PUBLICATIONS

European Search Report. Application No. 13163456.0-1903. Patent No. 2651110 Oct. 15, 2013.
"ThingLink Blog Get Creative with your images p. 6", ThingLink Blog, Jun. 27, 2011 pp. 1-18, XP55040029.
Eero: "ThingLink: Engaging Students in Learning and Discovery", ThingLink Blog, Jul. 1, 2011 pp. 1-3, XP55039997.
ThingLink: ThingLink Launches Rich Media Tags—How to Install It; excerpt, Jun. 15, 2011 pp. 1-6, XP55039977.
Justin Smith: "Facebook launching link sharing platform, embedding video—Digg clone coming?", Oct. 24, 2006, pp. 1-3, XP55030456.

* cited by examiner

*Primary Examiner* — Khanh Dinh
(74) *Attorney, Agent, or Firm* — Ziegler IP Law Group, LLC

(57) ABSTRACT

A method and apparatus for receiving an image associated with an interactive service on at least one social media server, the image belonging to a group of images. The image is stored and accessing of the image by a user is detected. In response, a request with an identification of the image is sent to a back-end server to access the interactive service. Interaction messages are exchanged with the interactive service so that the interactive service associated with the image is made available to users by accessing the image.

24 Claims, 4 Drawing Sheets

IMAGE BASED INTERACTION

TECHNICAL FIELD

The aspects of the disclosed embodiments generally relate to image based interaction.

BACKGROUND ART

THINGLINK™ has developed a system that lets users add interactive links to any photo and turn them into fun web experiences that drive engagement.

THINGLINK's™ Rich Media Tags feature popular media players and applications from YOUTUBE™, VIMEO™, SOUNDCLOUD™, GOOGLE MAPS™, SPOTIFY™, FLICKR™, FACEBOOK™, TWITTER™, LINKEDIN™, AMAZON™, eBAY™, BESTBUY™, iTUNES™, ETSY™, MAILCHIMP™ and FANBRIDGE™.

In practice, one image with interactive spots can be linked from its origin to a number of different internet publications. On moving a mouse pointer onto a marker of one of such spots, an associated script causes that a small preview of explanation of linked content appears. On clicking with a mouse on the marker, the script causes that a corresponding action takes place.

While the THINGLINK's™ system provides great advance in its image interaction, further improvements and alternatives for image based interaction are still desired.

SUMMARY

According to a first embodiment there is provided a method comprising:
storing a group of images;
associating the image with an interactive service on at least one social media server;
making the group of images available to a plurality of image publishers;
receiving from a requesting apparatus a request to access the interactive service associated with the group of images; and
exchanging interaction messages between the requesting apparatus and the interactive service so that the interactive service associated with the group of images is made available to users of any of the plurality of image publishers by accessing any image of the group of images.

The group of images may comprise one or more images. Different groups of images may comprise different number of groups of images.

The image publisher may be a content server. Alternatively, the image publisher may be a printed image publisher.

The requesting apparatus may be the content server.

The request may further comprise an identification of the location of the accessed image on the content server.

The method may further comprise defining a script with one or more actions with the group of images and sending the script to the requesting apparatus.

The interactive service may be associated with a given spot on the accessed image. The interaction service may be accessed by a user by accessing the given spot on the accessed image.

Each image of the group of images may be associated with an image identifier. The given spot may be associated with an image spot identifier. The image spot identifier and the image identifier may collectively define the image and the given spot of the image. Alternatively, the image spot identifier may be capable of uniquely identifying the image and the given spot on the image.

The image identifiers may be specific for respective group of images.

The image identifier may be attached to the image. The image identifier may be attached to the image by watermarking. Alternatively, or additionally, the image identifier may be stored in metadata of the image.

The image spot identifier may be attached to the image. The image spot identifier may be attached to the image by watermarking. Alternatively, or additionally, the image spot identifier may be stored in metadata of the image.

Information indicating the location of the image spot in the image may be also attached to the image. Information indicating the location of the image spot in the image may be also attached to the image by watermarking. Alternatively, or additionally, information indicating the location of the image spot in the image may be stored in metadata of the image.

At least one of the interaction messages may comprise the image identifier. Alternatively, or additionally, at least one of the interaction messages may comprise the image spot identifier.

The method may further comprise identifying the accessed image by performing a feature analysis of the image.

The interactive service may comprise a commenting functionality configured to enable users to post comments.

The interactive service may comprise a ranking functionality. The ranking functionality may be configured to enable a user to vote e.g. by liking or disliking content in the interactive service.

According to a second embodiment there is provided a method comprising:
receiving an image associated with an interactive service on at least one social media server, the image belonging to a group of images;
storing the image; and
detecting accessing of the image by a user and responsively:
sending to a back-end server a request to access the interactive service, the request comprising an identification of the image;
exchanging interaction messages with the interactive service so that the interactive service associated with the image is made available to users by accessing the image.

The request may further comprise an identification of the location of the image on a content server.

The method may further comprise receiving from a back-end server a script and storing the script.

The detecting of the accessing of the image may be caused by the script.

The image may be received from the back-end server. Alternatively, the image may be received from a user.

The sending to a back-end server an identification of the location of the image on the content server and a request to access the interactive service may be caused by the script.

The exchanging interaction messages with the interactive service may be caused by the script.

The method may further comprise determining identity of the image from an attached image identifier.

The method may further comprise determining identity of the image by computing a fingerprint of the image. The method may further comprise computing more than one fingerprints of the image. Each fingerprint may correspond to one distinguishable image object such as a person appearing in the image.

The method may further comprise forming the identification of the image based on the one or more fingerprints. The forming of the identification of the image may comprise querying for the identification with a query request compris-"

ing the one or more fingerprints. Alternatively, the identification of the image may be formed from the one or more fingerprints.

According to a third embodiment there is provided an apparatus comprising:
a memory configured to store a group of images; and
a processor configured to associate the image with an interactive service on at least one social media server; and to make the group of images available to a plurality of image publishers;
a communication interface configured to receive from a requesting apparatus a request to access the interactive service associated with the group of images; and to
exchange interaction messages between the requesting apparatus and the interactive service so that the interactive service associated with the group of images is made available to users of any of the plurality of image publishers by accessing any image of the group of images.

According to a fourth embodiment there is provided an apparatus comprising:
a communication interface configured to receive an image associated with an interactive service on at least one social media server, the image belonging to a group of images;
a memory configured to store the image; and
a processor configured to detect accessing of the image by a user and responsively:
the communication interface is further configured to send to a back-end server a request to access the interactive service, the request comprising an identification of the image;
wherein the communication interface is further configured to exchange interaction messages with the interactive service so that the interactive service associated with the image is made available to users by accessing the image.

According to a fifth example embodiment there is provided a computer program comprising computer executable program configured to cause an apparatus to perform, when executed by the apparatus, the method of any aspect or embodiment of the present disclosure.

According to a sixth example embodiment there is provided a memory medium comprising the computer program of the fifth example aspect. The memory medium may be a non-transitory memory medium.

Different non-binding example aspects of the disclosed embodiments have been illustrated in the foregoing.

BRIEF DESCRIPTION OF THE DRAWINGS

The aspects of the disclosed embodiments will be described, by way of example only, with reference to the accompanying drawings, in which.

DETAILED DESCRIPTION

Figure 1:
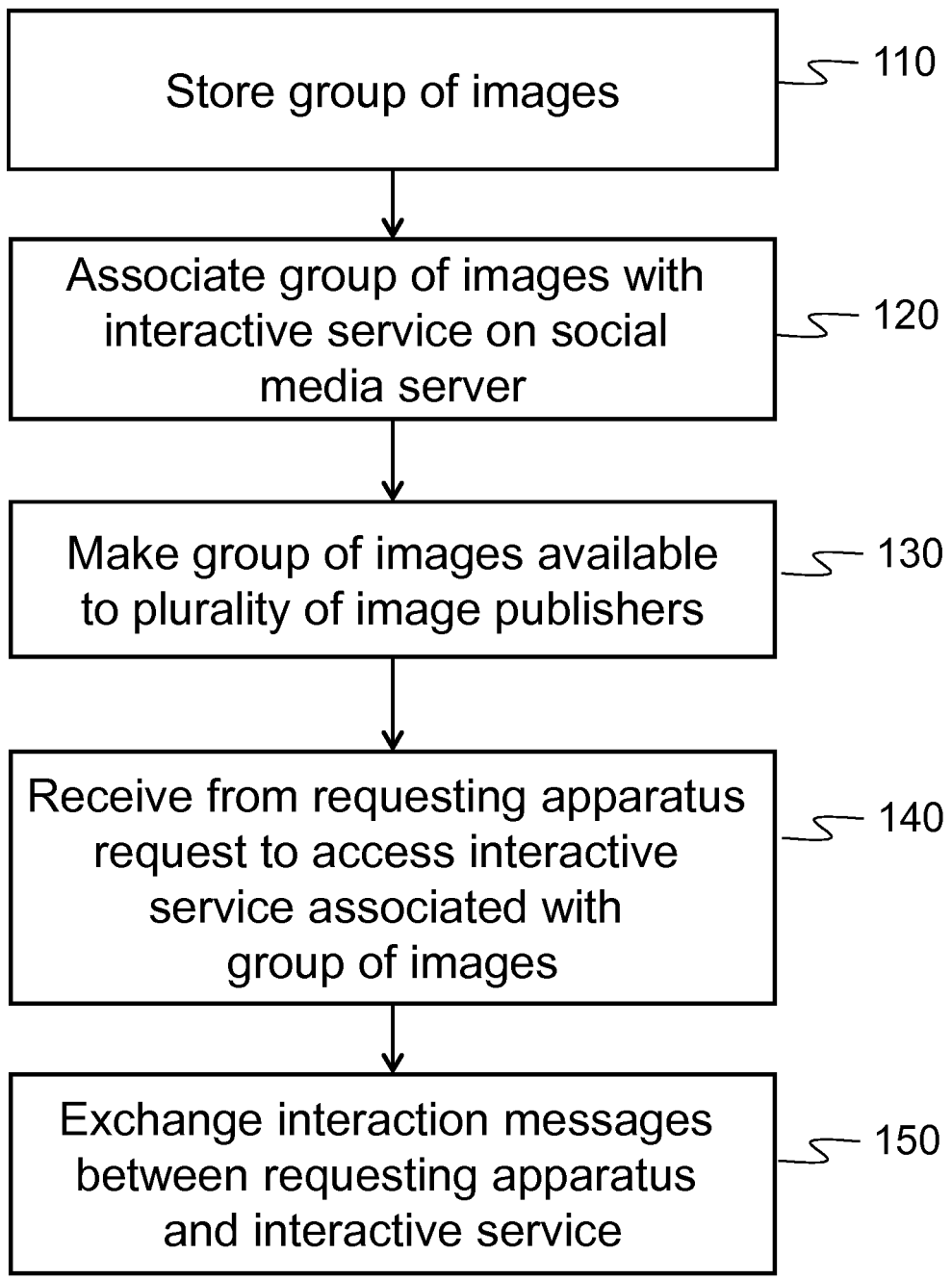
FIG. 1 shows a flow chart of a method according to an example embodiment illustrating operations at a back-end server.

FIG. 1 shows a flow chart of a method according to an example embodiment illustrating operations at a back-end server. The method comprises following main steps:

110 Storing a group of images, e.g. when a user uploads the image to the back-end server. The group may comprise one or more images e.g. of similar subjects. For instance, the images of the group can represent a new album of a rock star, the rock star and/or various associated items such as music videos and books.

120 Associating the group of images image with an interactive service on at least one social media server. This can be done, for instance, by the user defining actions to be associated with the image.

130 Making the group of images available to a plurality of image publishers. For instance, the image can be distributed in a variety of different blogs, emails, advertisements of electric distributions, Facebook posts or even printed publications such as magazines or posters.

140 Receiving from a requesting apparatus a request to access the interactive service associated with the group of images. The requesting apparatus is a term that can refer to, for instance, a content server or a user terminal with which a user photographs a printed image of the group of images and interacts with the back-end server. In some embodiments, the request comprises an identification of the location of a given image of the group of images on the content server. The location information enables determining the sources of requests to the interactive service based on the given image and thus enables providing of valuable further services.

150 Exchanging interaction messages between the requesting apparatus and the interactive service so that the interactive service associated with the group of images is made available to users of any of the plurality of image publishers by accessing any image of the group of images.

In practice, the operation of the content server or user terminal can be conveniently controlled by providing a suitable script with one or more actions associated with the group of images. The script can be obtained, for instance, from the back-end server by using the identifier of the image to identify a script with desired actions associated with the group of images.

The interactive service can be associated with a given spot on an image, i.e. hotspot. The interaction service can then be accessed by a user by accessing the given spot on the image. The hotspots can be individually located on different images of the group of images. Alternatively, the hotspots can be aligned e.g. by an image object recognition software configured to detect potentially distinguishing parts in the images. Further alternatively, the hotspots can be aligned according to a predetermined matrix or other grouping.

The images of the group of images can be associated with an image identifier. The given spot can also or alternatively be associated with an image spot identifier. In some embodiments, the image spot identifier and the image identifier may collectively define the image and the given spot of the image. Alternatively, the image spot identifier can be capable of uniquely identifying the image and the given spot on the image. The image identifier and/or the image spot identifier can further alternatively uniquely identify the group of images.

The image identifier and image spot identifier, when present, are stored by the back-end server that further distributes the identifiers to entities in need of them. In one example embodiment, the identifiers are delivered as attached to the images. This can be simply done by using metadata of image files and/or by using watermarking in which technique information is coded into the images themselves such that the difference is not perceivable by a human being but can be decoded by a computer.

At least one of the interaction messages may comprise the image identifier. Alternatively, or additionally, at least one of the interaction messages may comprise the image spot identifier.

In an example embodiment, the interactive service comprises a commenting functionality configured to enable users to post comments.

The interactive service comprises in one example embodiment a ranking functionality. The ranking functionality in one embodiment enables a user to vote e.g. by liking or disliking content in the interactive service.

Figure 2:
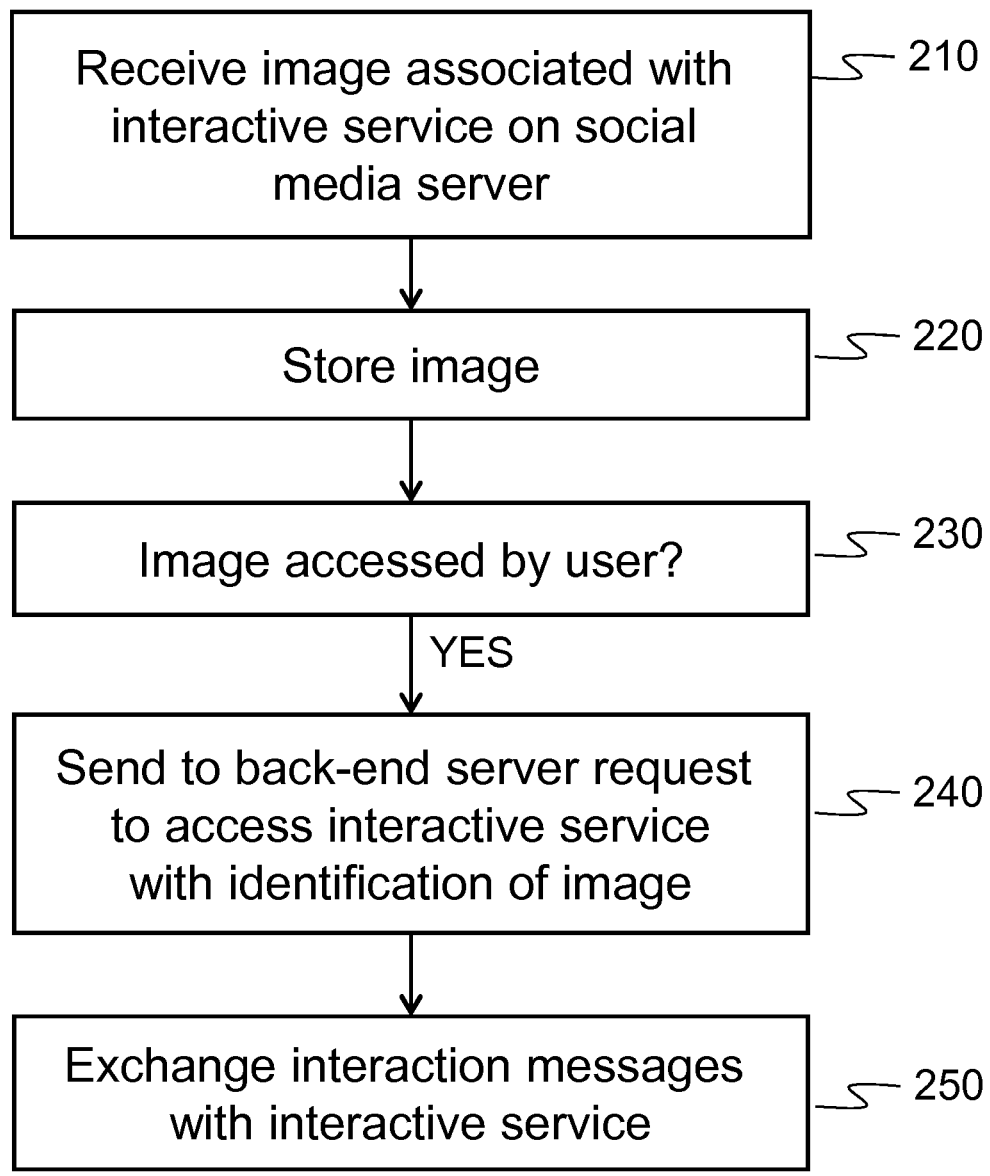
FIG. 2 shows a flow diagram of a method according to another example embodiment.

FIG. 2 shows a flow diagram of a method according to another example embodiment at a content server or user terminal. The method comprises following main steps:

210 Receiving an image associated with an interactive service on at least one social media server, the image belonging to a group of images. In case of a content server, the image can be received from an uploading user, for instance. In case of the user terminal, the image can be e.g. a printed image that the user can photograph. Once optically read into the user terminal, the user terminal can perform, according to an example embodiment, a feature analysis that results in fingerprints of the image based on which the image can be recognized. In another embodiment, the printed image is supplemented with a machine readable code such as a bar code or near field communications code that provides the user terminal with the image identifier or its derivative.

220 Storing the image.

230 Detecting accessing of the image by a user (e.g. idle or perform other tasks until the user has accessed the image) and responsively:

240 Sending to a back-end server a request to access the interactive service, the request comprising an identification of the image. This request can be triggered by user action such as clicking a hotspot on the image by a user of a content server or by the user taking an image of a printed image or issuing a command through a user interface of the user terminal. The request comprises, in an example embodiment, an identification of the location of the image on a content server.

250 Exchanging interaction messages with the interactive service so that the interactive service associated with the image is made available to users by accessing the image.

An example embodiment further comprises receiving from a back-end server a script and storing the script. Access to the image can be detected by the script.

The script can be used also or alternatively for sending to a back-end server an identification of the location of the accessed image on the content server and a request to access the interactive service. Further additionally or alternatively, the script can be used to cause the exchanging interaction messages with the interactive service.

The image fingerprint mentioned above can be specific for the entire accessed image or to the respective group of images. Alternatively, different objects in the image can be represented by individual fingerprints so as to discover use of a cropped part of an image such as a person appearing in the image.

In an example embodiment, the identification of the image is formed based on the one or more fingerprints. The forming of the identification of the image can be made e.g. by querying for the identification with a query request comprising the one or more fingerprints. Alternatively, the identification of the image can be formed from the one or more fingerprints. The fingerprints can be, for instance, combined using a concatenation operation.

Figure 3:
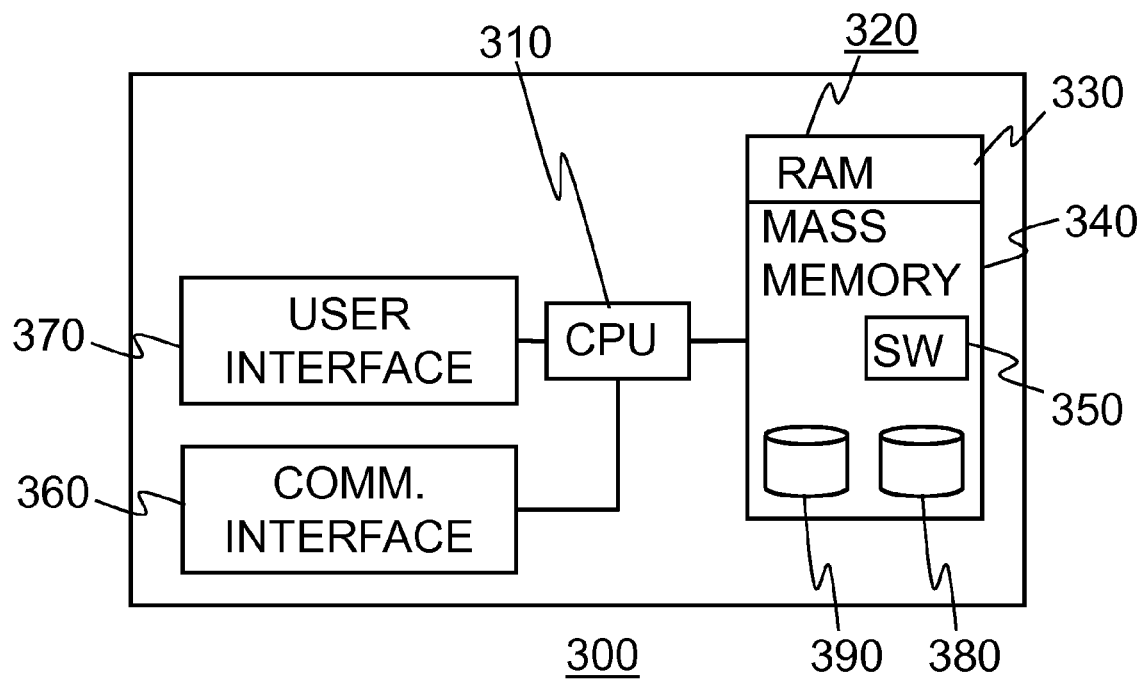
FIG. 3 shows a block diagram of a first server suited to operate as a back-end server.

FIG. 3 shows a block diagram of a first server 300 suited to operate as a back-end server. The first server 300 comprises a processor 310, a memory 320 including a work memory 330 and persistent memory 340 that comprises software 350 i.e. computer executable program code using which the processor 310 can control the operations of the first server 300. The processor can comprise, for instance, a central processing unit, a digital signal processor, or a cluster of central processing units. The work memory 330 can comprise, for instance, random access memory, SDRAM, DIMM modules, or any other rewriteable memory. The persistent memory 340 can comprise, for example, an optical storage medium, a magnetic storage medium, a hard disk, and/or a solid state disk. The first server 300 further comprises a communication interface 360 for exchanging information with other entities over one or more communication channels such as packet data networks, mobile communication networks, satellite networks, proprietary communication links and circuit switched channels. A user interface 370 is optionally provided. The first server 300 further comprises an image database 380 that comprises image identifiers, associated scripts or instructions regarding actions associated with images or hotspots on the images. The first server 300 further comprises a user database 390 comprising user accounts and access rights to the image database. The access rights specify which users can modify which records of the image database. For instance, each user can be allowed to upload images or associated information to the image database 380 and later modify the uploaded images and the associated information. The content servers can be made to respectively update the images stored therein if any changes have been made by the user to images.

While FIG. 3 makes a formal distinction between the image database 380 and the user database 390, these databases can be formed using a single database or split into more databases.

Figure 4:
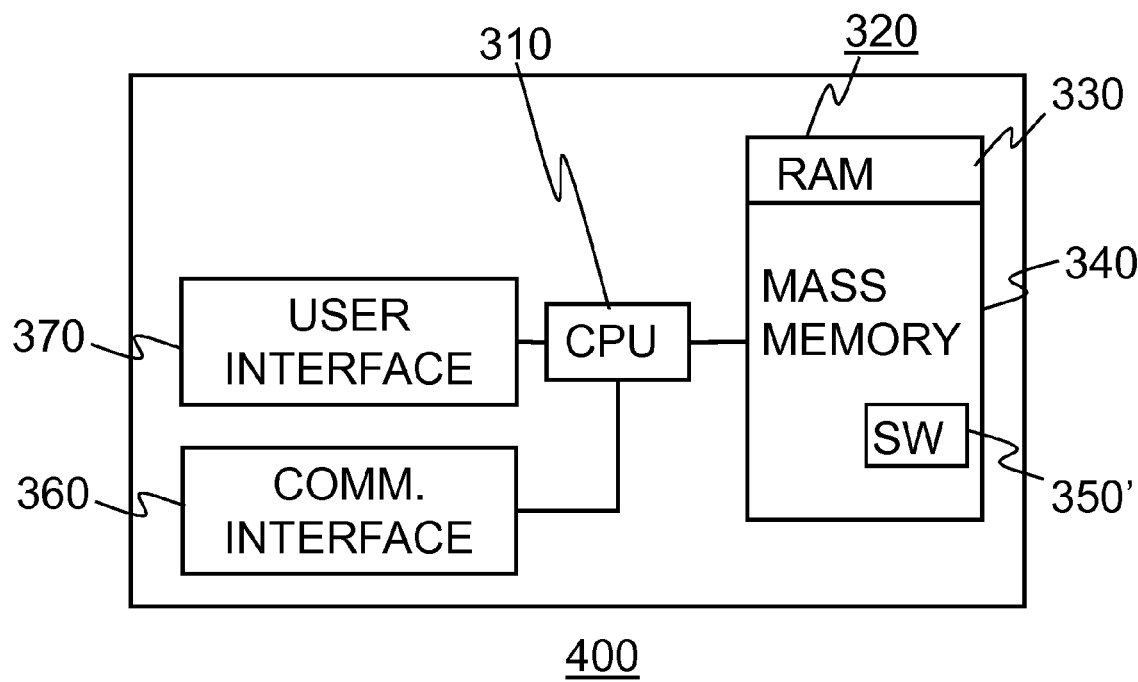
FIG. 4 shows a block diagram of a second server suited to operate as a content server according to an example embodiment.

FIG. 4 shows a block diagram of a second server 400 suited to operate as a content server according to an example embodiment. FIG. 4 is otherwise corresponding to FIG. 3 except that FIG. 4 lacks the databases of FIG. 3 and that FIG. 3 shows software 350' that is configured for the second server 400. Hence, FIG. 4 needs no further description as the functional blocks of FIG. 4 operate like those in FIG. 3.

Figure 5:
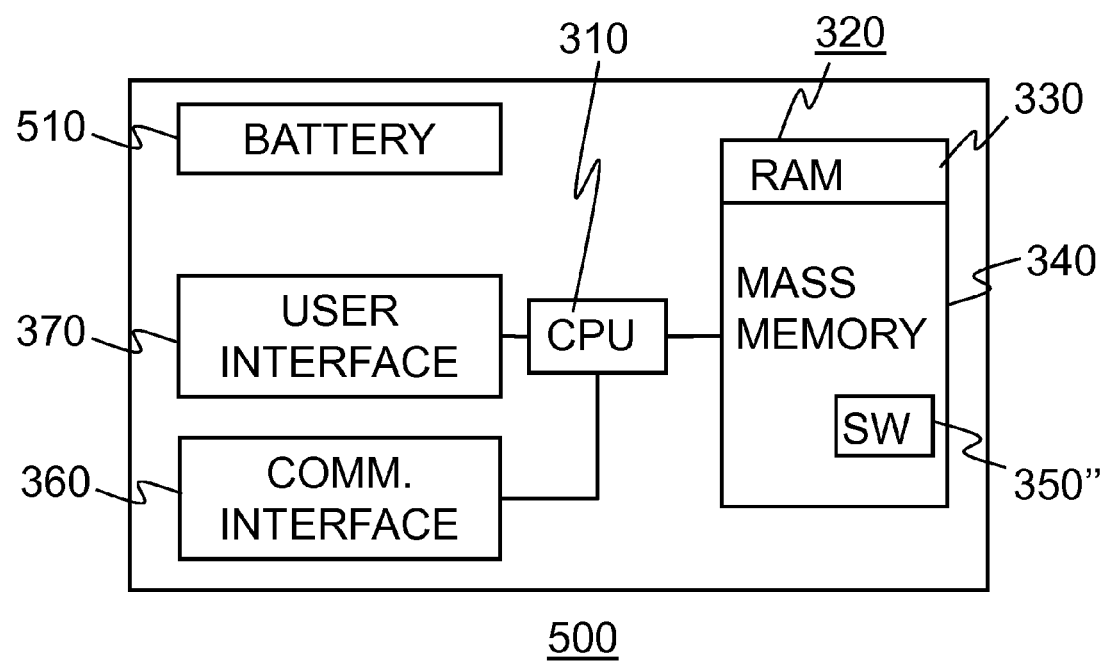
FIG. 5 shows a block diagram of an apparatus suited to operate as a user terminal according to an example embodiment.

FIG. 5 shows a block diagram of an apparatus 500 suited to operate as a user terminal according to an example embodiment. FIG. 5 has blocks corresponding to those in FIG. 4 except that additionally, FIG. 5 shows a battery 510 for mobile use and a different version of the software with reference sign 350". It is also understood that for mobile use, the user terminal 500 can be built using power-efficient and lightweight components whereas in server use, mobility and weight is not an issue. Hence, the mass memory, for instance, can be e.g. a flash memory or replaceable memory card such as a micro-SD memory card, although there are also very light and compact hard disks that are well suited for mobile use.

It should be understood that the user terminal can be made in a wide variety of shapes and sizes and for a multitude of different other purposes as well. The user terminal can be adapted to function as a laptop computer, mobile telephone, personal digital assistant, personal computer, browsing device such as a tabloid computer, game console, handheld game device, navigator device, personal digital assistant and/or electric book.

Various embodiments have been presented. It should be appreciated that in this document, words comprise, include and contain are each used as open-ended expressions with no intended exclusivity.

The foregoing description has provided by way of non-limiting examples of particular implementations and aspects of the disclosed embodiments a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. It is also noted that the above embodiments are used merely to explain selected aspects or steps that may be utilized in implementations of the present invention. Some features may be presented only with reference to certain example embodiments of the invention. It should be appreciated that corresponding features may apply to other embodiments as well.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
   storing a group of images of similar subjects, the group of images comprising at least two images;
   associating the group of at least two images with an interactive service on at least one social media server;
   making the group of at least two images available to a plurality of image publishers;
   receiving from a requesting apparatus a request to access the interactive service associated with the group of at least two images;
   exchanging interaction messages between the requesting apparatus and the interactive service so that the interactive service associated with the group of at least two images is made available to users of any of the plurality of image publishers by accessing any image of the group of at least two images; and
   enabling the requesting apparatus to post a comment with respect to an image from the group of at least two images through the interactive service, and wherein the exchange of interaction messages further comprises making the comment available to the users of any of the plurality of image publishers through the interactive service,
   wherein the request further comprises a location on the requesting apparatus of a copy of at least one of the images for identifying a source of the request, and wherein the interactive service is associated with a given spot on the accessed image.

2. The method of claim 1, wherein the image publisher is a content server.

3. The method of claim 1, wherein the image publisher is a printed image publisher.

4. The method of claim 2, wherein the requesting apparatus is the content server.

5. The method of claim 1, further comprising defining a script with one or more actions with the group of images and sending the script to the requesting apparatus.

6. The method of claim 1, further comprising identifying the accessed image by performing a feature analysis of the image.

7. The method of claim 1, wherein the interactive service comprises a commenting functionality configured to enable users to post comments.

8. The method of claim 1, wherein the interactive service comprises a ranking functionality.

9. The method of claim 1, wherein the comment is a ranking of the content of the image.

10. A method comprising:
    receiving an image associated with an interactive service on at least one social media server, the image belonging to a group of images of similar subjects, the group of images comprising at least two images;
    storing the image; and
    detecting accessing of the image by a user and responsively:
    sending to a back-end server a request to access the interactive service, the request comprising an identification of the image; and
    exchanging interaction messages with the interactive service so that the interactive service associated with the image is made available to users by accessing any image of the group of images; and
    enabling the requesting apparatus to post a comment with respect to an image from the group of at least two images through the interactive service, and wherein the exchange of interaction messages further comprises making the comment available to the users of any of the plurality of image publishers through the interactive service,
    wherein the request further comprises a location on the requesting apparatus of a copy of at least one of the images for identifying a source of the request, and wherein the interactive service is associated with a given spot on the accessed image.

11. The method of claim 10, wherein the method further comprises receiving from a back-end server a script and storing the script.

12. The method of claim 11, wherein the detecting of the accessing of the image is caused by the script.

13. The method of claim 10, wherein the image is received from the back-end server.

14. The method of claim 10, further comprising determining identity of the image by computing a fingerprint of the image.

15. An apparatus comprising:
    a memory configured to store a group of images of similar subjects, the group of images comprising at least two images; and
    a processor configured to associate the image with an interactive service on at least one social media server; and to make the group of images available to a plurality of image publishers;
    a communication interface configured to:
    receive from a requesting apparatus a request to access the interactive service associated with the group of images;
    exchange interaction messages between the requesting apparatus and the interactive service so that the interactive service associated with the group of images is made available to users of any of the plurality of image publishers by accessing any image of the group of images; and
    enable the requesting apparatus to post a comment with respect to an image from the group of at least two images through the interactive service, and wherein the exchange of interaction messages further comprises making the comment available to the users of any of the plurality of image publishers through the interactive service,
    wherein the request further comprises a location on the requesting apparatus of a copy of at least one of the images for identifying a source of the request, and wherein the interactive service is associated with a given spot on the accessed image.

16. The apparatus of claim 15, wherein the image publisher is a content server.

17. The apparatus of claim 16, wherein the requesting apparatus is the content server.

18. The apparatus of claim 15, wherein the processor is further configured to define a script with one or more actions with the group of images and to send the script to the requesting apparatus.

19. The apparatus of claim 15, wherein the processor is further configured to identify the accessed image by performing a feature analysis of the image.

20. An apparatus comprising:
   a communication interface configured to receive an image associated with an interactive service on at least one social media server, the image belonging to a group of images of similar subjects, the group of images comprising at least two images;
   a memory configured to store the image; and
   a processor configured to detect accessing of the image by a user and responsively:
   the communication interface is further configured to send to a back-end server a request to access the interactive service, the request comprising an identification of the image;
   wherein the communication interface is further configured to exchange interaction messages with the interactive service so that the interactive service associated with the image is made available to users by accessing any image of the group of images; and
   wherein the communication interface is further configured to enable the requesting apparatus to post a comment with respect to an image from the group of at least two images through the interactive service, and wherein the exchange of interaction messages further comprises making the comment available to the users of any of the plurality of image publishers through the interactive service,
   wherein the request further comprises a location on the requesting apparatus of a copy of at least one of the images for identifying a source of the request, and wherein the interactive service is associated with a given spot on the accessed image.

21. The apparatus of claim 20, wherein the communication interface is further configured to receive a script from a back-end server and the memory is further configured to store the script.

22. The apparatus of claim 21, wherein the detecting of the accessing of the image is caused by the script.

23. The apparatus of claim 20, wherein the processor is further configured to determine identity of the image by computing a fingerprint of the image.

24. A method comprising:
   receiving an image associated with an interactive service on at least one social media server, the image belonging to a group of images of similar subjects, the group of images comprising at least two images;
   storing the image; and
   detecting accessing of the image by a user and responsively:
   sending to a back-end server a request to access the interactive service, the request comprising an identification of the image;
   exchanging interaction messages with the interactive service so that the interactive service associated with the image is made available to users by accessing any image of the group of images; and
   enabling the requesting apparatus to post a ranking with respect to an image from the group of at least two images through the interactive service, and wherein the exchange of interaction messages further comprises making the ranking available to the users of any of the plurality of image publishers through the interactive service,
   wherein the request further comprises a location on the requesting apparatus of a copy of at least one of the images for identifying a source of the request, and wherein the interactive service is associated with a given spot on the accessed image.

* * * * *